(12) United States Patent
Griffin (10) Patent No.: US 10,380,367 B2
(45) Date of Patent: Aug. 13, 2019

(54) DYNAMIC ACCESS CONTROL OF RESOURCES IN A COMPUTING ENVIRONMENT

(71) Applicant: Red Hat, Inc., Raleigh, NC (US)

(72) Inventor: Leigh Griffin, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 0 days.

(21) Appl. No.: 15/661,380

(22) Filed: Jul. 27, 2017

(65) Prior Publication Data

US 2019/0034651 A1 Jan. 31, 2019

(51) Int. Cl.
  G06F 21/00 (2013.01)
  G06F 21/62 (2013.01)
  G06F 21/60 (2013.01)

(52) U.S. Cl.
  CPC ...... G06F 21/6218 (2013.01); G06F 21/6281 (2013.01); G06F 21/604 (2013.01)

(58) Field of Classification Search
  None
  See application file for complete search history.

(56) References Cited

U.S. PATENT DOCUMENTS

| | | | |
|---|---|---|---|
| 6,941,355 B1* | 9/2005 | Donaghey | G06F 17/3089 707/E17.116 |
| 8,250,642 B2* | 8/2012 | Bartholomy | H04L 12/66 726/11 |
| 8,528,047 B2 | 9/2013 | Terzis et al. | |
| 8,640,107 B2 | 1/2014 | Jaeger et al. | |
| 8,959,580 B2 | 2/2015 | Lim | |
| 9,443,101 B2 | 9/2016 | Jacquin | |
| 2003/0065942 A1 | 4/2003 | Lineman et al. | |
| 2004/0193703 A1* | 9/2004 | Loewy | H04L 41/0893 709/220 |
| 2006/0179028 A1* | 8/2006 | Bram | G06N 5/043 706/47 |
| 2007/0277222 A1* | 11/2007 | Pouliot | G06F 21/552 726/1 |
| 2008/0034433 A1* | 2/2008 | Kim | H04L 63/1416 726/23 |
| 2009/0049512 A1* | 2/2009 | Manickam | H04L 63/0407 726/1 |
| 2009/0164499 A1* | 6/2009 | Samudrala | G06F 21/604 |

(Continued)

OTHER PUBLICATIONS

Griffin, Leigh, "Managing the Formation and Interaction of Groups within Emerging Social Networks," Doctoral Dissertation, Waterford Institute of Technology, Sep. 2012, 201 pages.

(Continued)

Primary Examiner — Maung T Lwin
(74) Attorney, Agent, or Firm — Withrow & Terranova, PLLC (57) ABSTRACT

Dynamic access control of resources in a computing environment is disclosed. A policy retrieval point continuously monitors at least one new policy creation location for a new policy rule. It is detected that a first new policy rule has been added to the at least one new policy creation location. The first new policy rule is stored in a core policy rule structure that comprises a plurality of policy rules. A request for new policy rules is received, and the first new policy rule is communicated toward a policy decision point in response to the request.

19 Claims, 9 Drawing Sheets

(56) References Cited

U.S. PATENT DOCUMENTS

| | | | |
|---|---|---|---|
| 2009/0165078 A1* | 6/2009 | Samudrala | G06F 21/604 726/1 |
| 2011/0289196 A1* | 11/2011 | Siddam | H04L 12/1407 709/220 |
| 2011/0321122 A1 | 12/2011 | Mwangi et al. | |
| 2012/0131164 A1* | 5/2012 | Bryan | G06F 21/604 709/223 |
| 2014/0090012 A1* | 3/2014 | Lim | G06Q 10/10 726/1 |
| 2016/0191466 A1* | 6/2016 | Pernicha | H04L 63/20 726/1 |

OTHER PUBLICATIONS

Hayati, Katia, et al., "Language-Based Enforcement of Privacy Policies," Proceedings of the 4th International Conference on Privacy Enhancing Technologies, May 26, 2004, Springer-Verlag, 12 pages.

Inoue, Hajime, et al., "Inferring Java Security Policies through Dynamic Sandboxing," International Conference on Programming Languages and Compilers, Jun. 2005, CSREA Press, 7 pages.

Tonti, Gianluca, "Automated Generation of Enforcement Mechanisms for Semantically-rich Security Policies in Java-based Multi-Agent Systems," First Symposium on Multi-Agent Security and Survivability, Aug. 2004, IEEE, pp. 11-20.

\* cited by examiner

DYNAMIC ACCESS CONTROL OF RESOURCES IN A COMPUTING ENVIRONMENT

TECHNICAL FIELD

The examples relate to the dynamic access control of resources in a computing environment.

BACKGROUND

Access to control of resources, such as which entities can access which files or services in a computing environment, is critical to the security and safety of information maintained in the computing environment.

SUMMARY

The examples disclosed herein provide dynamic access control of resources in a computing environment. In some of the disclosed examples, access control policy rules are developed in a Turing-complete programming language which allows runtime conditional decisions to be made based on contextual information that may change over time. Newly created policy rules are automatically detected and distributed, without human intervention, to one or more policy decision points that implement the policy rules in response to requests for access to a resource. Thus, new policy rules can be implemented without the need to terminate the access control system, and new policy rules are automatically distributed to each policy decision point in the distributed system without a need for a human to be aware of each policy decision point to which the new policy rules must be distributed.

In one example, a method is provided. The method includes continuously monitoring, by a policy retrieval point executing on a processor device, at least one new policy creation location for a new policy rule. The method further includes detecting that a first new policy rule has been added to the at least one new policy creation location. The method further includes storing the first new policy rule in a core policy rule structure that comprises a plurality of policy rules. The method further includes receiving a request for new policy rules and communicating the first new policy rule toward a policy decision point in response to the request for the new policy rules.

In another example a computing system is provided. The computing system includes one or more memories and one or more processor devices coupled to the one or more memories. The one or more processor devices are to, over a period of time, continuously monitor at least one new policy creation location for a new policy rule. The one or more processor devices are further to detect that a first new policy rule has been added to the at least one new policy creation location. The one or more processor devices are further to store the first new policy rule in a core policy rule structure that comprises a plurality of policy rules. The one or more processor devices are further to receive a request for new policy rules and communicate the first new policy rule toward a policy decision point in response to the request for the new policy rules.

In another example a computer program product is provided. The computer program product is stored on a non-transitory computer-readable storage medium and includes instructions to cause one or more processor devices to, over a period of time, continuously monitor at least one new policy creation location for a new policy rule. The instructions further cause the one or more processor devices to detect that a first new policy rule has been added to the at least one new policy creation location. The instructions further cause the one or more processor devices to store the first new policy rule in a core policy rule structure that comprises a plurality of policy rules. The instructions further cause the one or more processor devices to receive a request for new policy rules and communicate the first new policy rule toward a policy decision point in response to the request for the new policy rules.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first policy decision point" and "second policy decision point," and does not imply a priority, a type, an importance, or other attribute, unless otherwise stated herein. As used herein and in the claims, the articles "a" and "an" in reference to an element refers to "one or more" of the element unless otherwise explicitly specified.

Access control systems control access to electronic resources, such as files and the like, by individuals, computing processes, and the like. Typically access control policies are created or updated via a static structure, such as an access control data file, that contains data that identifies 1) the resource, 2) the access rights, and 3) the subject. Upon an attempted access of the resource, the access control system accesses the access control data file and determines whether the attempted access is allowed or not. Updates to the access control rights involve updating the access control data file, and often involve taking the access control system down so that integrity checks for consistency with other policies can be manually made. The access control system is then re-initiated, and the access control system reloads the updated access control data file. This can lead to service interruptions while the access control system is being reloaded. Alternatively, the access control system may not be taken down until a future time when a disruption would be minimal, but this delays the implementation of the new access control policy, which inherently creates a security risk during the interim.

In a distributed environment where access control may be implemented in multiple locations, an administrator may need to update the access control data file in each such location, and reboot the access control system associated with each such location. Failure to update each of the multiple locations can lead to inconsistent access rights being granted, and user frustration.

Conventional access control systems are relatively rigid in that new conditions for access control rights may require modification of the access control system itself in addition to the access control data file. This requires specialized expertise, often resulting in long delays between a desire to implement new access control conditions and the actual implementation of new access control conditions.

The examples disclosed herein provide dynamic access control of resources in a computing environment. In some of the disclosed examples, access control policy rules are developed in a Turing-complete programming language which allows runtime conditional decisions to be made based on contextual information that may change over time. Newly created policy rules are automatically detected and distributed, without human intervention, to one or more policy decision points that implement the policy rules in response to requests for access to a resource. Thus, new policy rules can be implemented without the need to terminate the access control system, and new policy rules are automatically distributed to each policy decision point in the distributed system without a need for a human to be aware of each policy decision point to which the new policy rule must be distributed.

The examples disclosed herein may also automatically, without human intervention, validate each newly detected policy rule prior to implementing the policy rule. The validation may include, for example, determining whether executable instructions of the new policy rule comply with a programming language syntax of an executable programming language. The validation may also include determining whether the new policy rule implements access rights in a way that is consistent with any existing policy rules.

Figure 1:
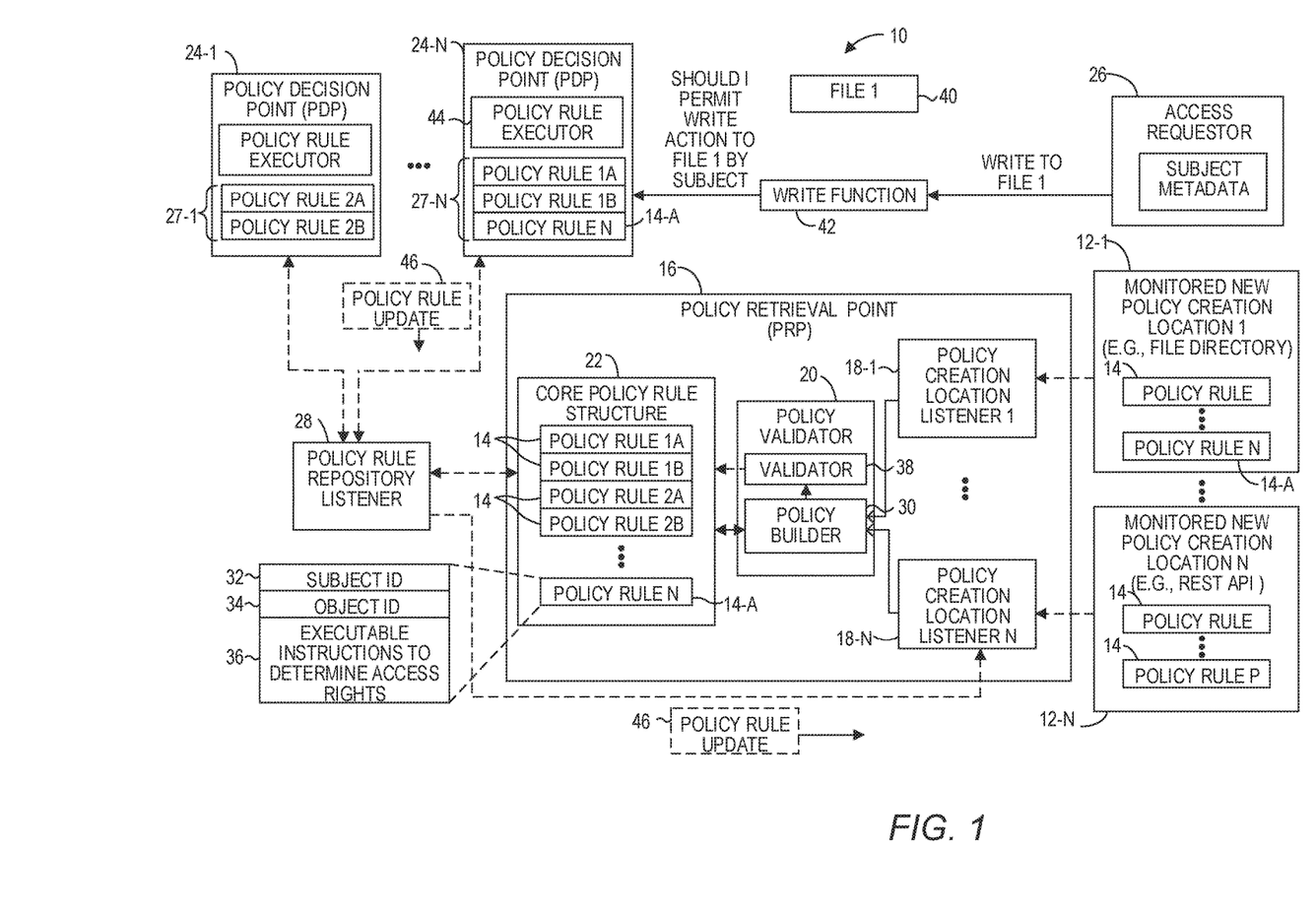
FIG. 1 is a block diagram of an environment in which examples may be practiced.

FIG. 1 is a block diagram of an environment 10 in which examples may be practiced according to one example. The environment 10 includes one or more new policy creation locations 12-1-12-N (generally, new policy creation locations 12). Each new policy creation location 12 is a location where a new policy rule 14 may be created. For example, the new policy creation location 12-1 may comprise a particular directory, or volume, of a storage device where a new policy rule 14 may be stored after creation. The new policy creation location 12-N may be a representational state transfer (REST) application programming interface (API) endpoint that can be queried to determine if a new policy rule 14 has been created. A new policy creation location 12 may comprise any suitable means of storing a new policy rule after creation. As another example, a new policy creation location 12 may comprise a database.

The environment 10 also includes a policy retrieval point (PRP) 16. The PRP 16 includes one or more policy creation location listeners 18-1-18-N (generally, policy creation location listeners 18). Each policy creation location listener 18 monitors a corresponding new policy creation location 12 for the addition of new policy rules 14. Upon determining, or detecting, the existence of a new policy rule 14, the policy creation location listener 18 obtains the new policy rule 14 and passes or otherwise communicates the new policy rule 14 to a policy validator 20 for validation. If the policy validator 20 is able to successfully validate the new policy rule 14, the policy validator 20 can store the new policy rule 14 into a core policy rule structure 22.

The environment 10 also includes one or more policy decision points (PDPs) 24-1-24-N (generally, PDPs 24). Each PDP 24 receives access requests from a corresponding access requestor 26 and grants or denies the access request. Each PDP 24-1-24-N has a corresponding local store 27-1-27-N of policy rules 14 that the PDPs 24-1-24-N execute to determine whether an access request should be granted or denied.

In some examples, a policy rule repository listener 28 monitors the core policy rule structure 22 for new policy rules 14 stored in the core policy rule structure 22. One or more of the PDPs 24 may subscribe to the policy rule repository listener 28. Upon determining that a new policy rule 14 as been stored in the core policy rule structure 22, the policy rule repository listener 28 may notify each PDP 24 that has subscribed with the policy rule repository listener 28 that a new policy rule 14 has been stored in the core policy rule structure 22. In response, a PDP 24 may request that the policy rule repository listener 28 provide the new policy rule 14 to the PDP 24. In some examples, the request may include filters to limit which new policy rules 14 a policy rule repository listener 28 provides to a PDP 24. Each PDP 24 may, for example, be responsible for handling access requests to different classes or categories of electronic resources, and thus may request only those new policy rules 14 that pertain to the respective electronic resources.

As an example of policy rule handling in the environment 10, assume that a new policy rule 14-A is stored in the new policy creation location 12-1. For example, a user may develop the new policy rule 14-A, compile it, and when complete, store it in the new policy creation location 12-1. The new policy rule 14-A is written in a Turing complete programming language, such as, by way of non-limiting example, CoffeeScript, and thus must comply with the syntax of the respective programming language. Because the policy rules 14 are written in a Turing complete programming language, the policy rules 14 can implement any desirable algorithm for determining whether or not access to a resource should be granted. Moreover, the policy rules 14 may be dynamically updated based on contextual information, as described in greater detail below.

The policy creation location listener 18-1 detects the existence of the new policy rule 14-A in the new policy creation location 12-1. The policy creation location listener 18-1 accesses the new policy rule 14-A and communicates the new policy rule 14-A to a policy builder 30 of the policy validator 20. Each policy rule 14 includes certain metadata, such as a subject identifier (ID) 32, which identifies the requestor entity to which the policy rule 14 applies, and a resource ID 34, which identifies the electronic resource to which the policy rule 14 applies. Each policy rule 14 also includes an executable instruction portion 36 which is the portion of the policy rule 14 that is executed by a PDP 24 when the PDP 24 receives an access request to access the respective electronic resource.

The policy builder 30 receives the new policy rule 14-A and accesses the core policy rule structure 22 to determine whether the new policy rule 14-A may have related policy rules 14 that were previously stored in the core policy rule structure 22. For example, the policy builder 30 may retrieve a subset of policy rules 14 that have the same subject ID 32 and/or the same resource ID 34 as the new policy rule 14-A.

The policy builder 30 provides the new policy rule 14-A and any related policy rules 14 obtained from the core policy rule structure 22 to a validator 38. The validator 38 validates the new policy rule 14-A prior to storing the new policy rule 14-A in the core policy rule structure 22. Validation may involve a number of different stages. In one stage, the validator 38 may determine that the plurality of executable instructions of the new policy rule 14-A complies with a programming language syntax of the particular executable programming language in which the new policy rule 14-A is written. In another stage, the validator 38 may make a determination that the new policy rule 14-A does not implement access rights in a way that is inconsistent with any of the policy rules 14 in a subset of policy rules 14 provided by the validator 38. If the new policy rule 14-A does not pass one of the validation stages, the validator 38 refrains from storing the new policy rule 14-A in the core policy rule structure 22. The validator 38 may issue a warning, or generate a record in a logfile that documents the reason why the new policy rule 14-A did not pass one of the validation stages. In this example, assume for purposes of illustration that the new policy rule 14-A passes the validation stages. The policy validator 20 then stores the new policy rule 14-A in the core policy rule structure 22.

The policy rule repository listener 28 detects the new policy rule 14-A in the core policy rule structure 22. Assume for purposes of illustration that the PDPs 24-1 and 24-N each subscribe to the policy rule repository listener 28. The policy rule repository listener 28 sends each of the PDPs 24-1 and 24-N a notification that a new policy rule 14 exists. Each of the PDPs 24-1 and 24-N request the new policy rule 14-A if the new policy rule 14-A meets certain criteria. In this example, assume that the new policy rule 14-A does not meet the criteria provided by the PDP 24-1, but does meet the criteria provided by the PDP 24-N. The policy rule repository listener 28 requests the new policy rule 14-A from the PRP 16 and provides the new policy rule 14-A to the PDP 24-N. The PDP 24-N stores the new policy rule 14-A in the local store 27-N. The access requestor 26 may then attempt to write to a resource 40, which, in this example, is a file. A write function 42 of an operating system receives a write request from the access requestor 26, and sends a query to the PDP 24-N requesting whether or not to allow the access requestor 26 to write to the resource 40. The write function 42 may provide to the PDP 24-N a subject ID 32 that identifies the subject associated with the access requestor 26, such as a user, and a resource ID 34 that identifies the resource 40.

The PDP 24-N, based on the subject ID 32 and the resource ID 34, determines that the new policy rule 14-A implements access control rights for the requested write operation. A policy rule executor 44 of the PDP 24-N executes the new policy rule 14-A. The new policy rule 14-A runs and upon termination returns a result to the policy rule executor 44 that indicates whether or not the access request should be granted.

As will be discussed in greater detail below, the PDP 24-N may determine that a policy rule 14 has, while executing, learned contextual information that may affect any policy rule 14 that relates to the same subject or resource. The PDP 24-N may then generate a policy rule update message 46 that identifies the subject, the resource, and the contextual information, and send the policy rule update message 46 to the policy rule repository listener 28. The contextual information may comprise any suitable information. In some examples, contextual information may be captured, for example, by an anonymous function. The policy rule repository listener 28 sends the policy rule update message 46 to the policy creation location listener 18-N. The policy creation location listener 18-N may then provide the policy rule update message 46 to the policy builder 30. The policy builder 30, based on the subject ID and the resource ID in the policy rule update message 46, accesses the core policy rule structure 22 and obtains a subset of policy rules 14 that are related to the policy rule update message 46. The policy validator 20 may then incorporate the contextual information into each of the policy rules 14 and thereby generate new, updated policy rules 14. The updated policy rules 14 may then be stored in the core policy rule structure 22.

The policy rule repository listener 28 detects the updated policy rules 14, and notifies the PDPs 24-1-24-N that a new policy rule 14 exists. The PDPs 24-1-24-N may provide a request for the updated policy rules 14 if the updated policy rules 14 meet certain criteria. The policy rule repository listener 28 provides the updated policy rules 14 to each such PDP 24 based on the criteria. In this manner, the policy rules 14 can be dynamically altered based on contextual information, and automatically distributed to each PDP 24 without human involvement.

While for purposes of illustration the PRP 16 is illustrated as implementing functionality via certain functional components, such as the policy creation location listeners 18 and the policy validator 20, the examples are not limited to a particular number of functional components, and the functionality described herein with regard to the PRP 16 may be implemented in fewer or more functional components. Thus, functionality attributed to any particular functional component, such as the policy creation location listeners 18 and the policy validator 20, may also generally be attributed to the PRP 16.

Figure 2:
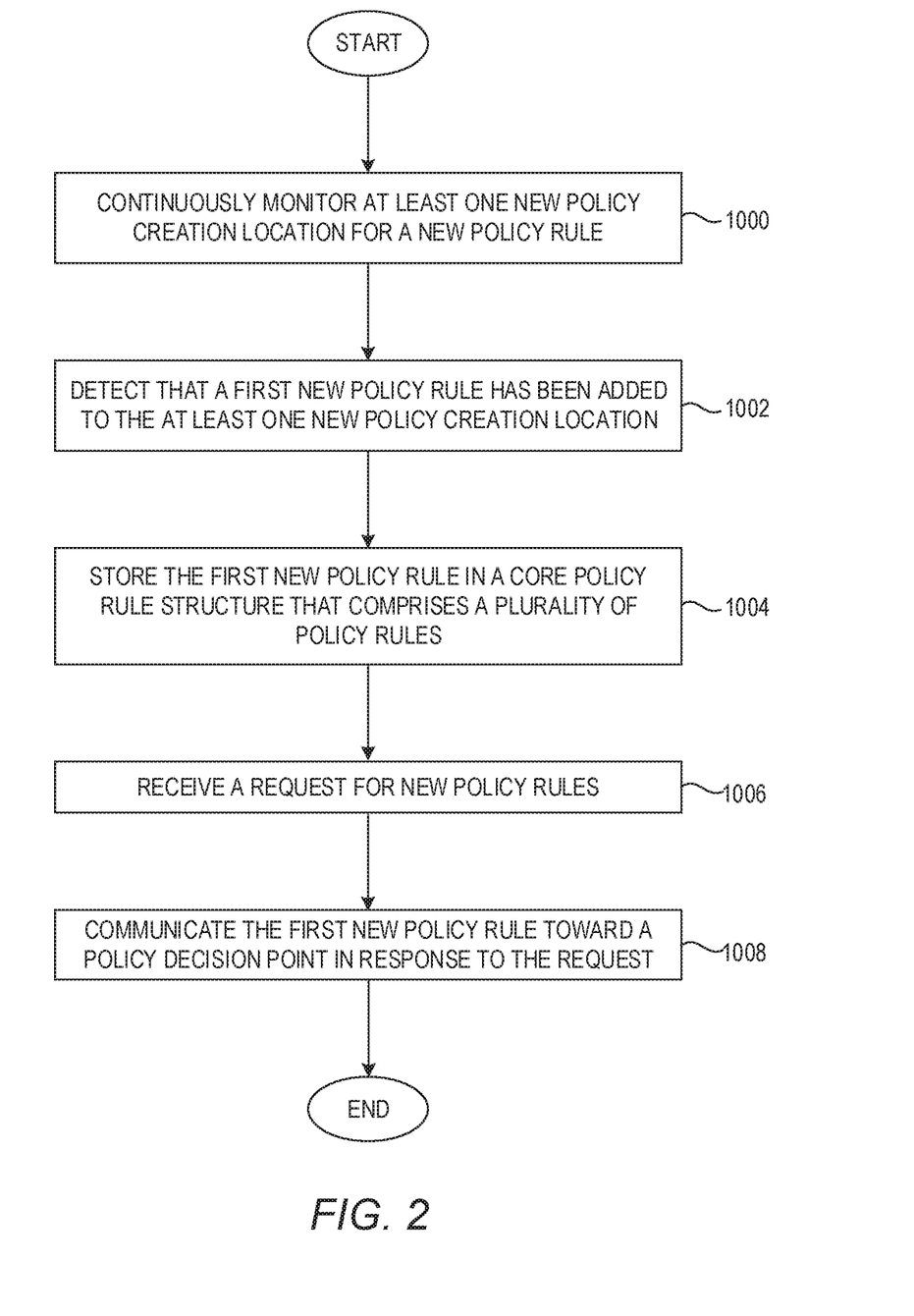
FIG. 2 is a flowchart of a method for dynamically distributing a new policy rule according to one example.

FIG. 2 is a flowchart of a method for dynamically distributing a new policy rule 14 according to one example. FIG. 2 will be discussed in conjunction with FIG. 1. Over a period of time, the PRP 16 continuously monitors the new policy creation location 12-1 for a new policy rule 14 (FIG. 2, block 1000). The PRP 16 detects that the first new policy rule 14-A has been added to the new policy creation location 12-1 (FIG. 2, block 1002). The PRP 16 stores the first new policy rule 14-A in the core policy rule structure 22 (FIG. 2, block 1004). The PRP 16 receives a request for new policy rules 14 (FIG. 2, block 1006). In response, the PRP 16 communicates the new policy rule 14-A toward the PDP 24-N in response to the request (FIG. 2, block 1008). As used herein, the term "toward" in conjunction with sending data means that the data is ultimately directed to a particular component or element, but may get to the particular component or element via one or more intermediaries.

Figure 3A:
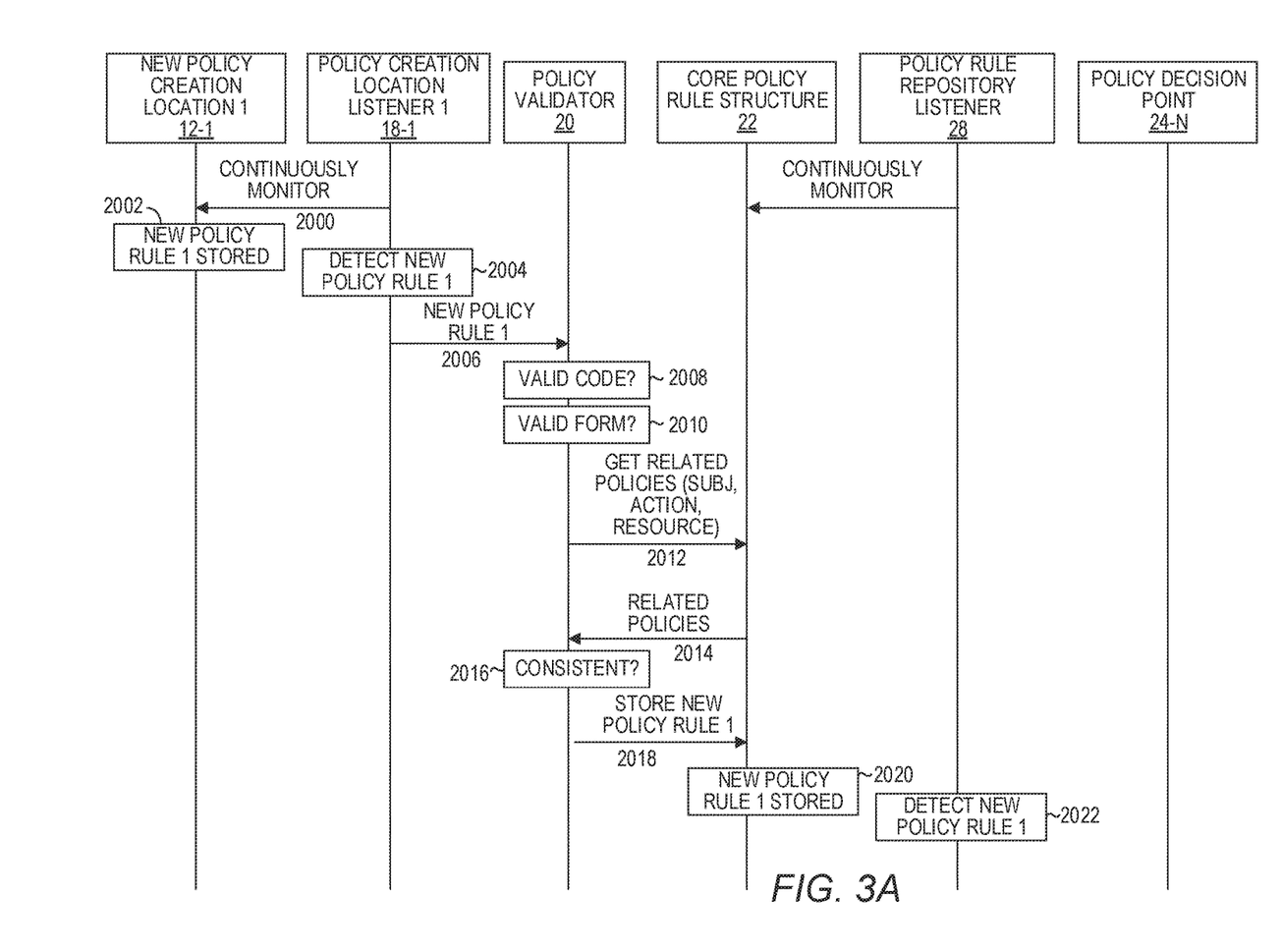
FIGS. 3A-3B are a message flow diagram illustrating a sequence of messages relating to the distribution of a new policy rule to a policy decision point (PDP) according to one example.
Figure 3B:
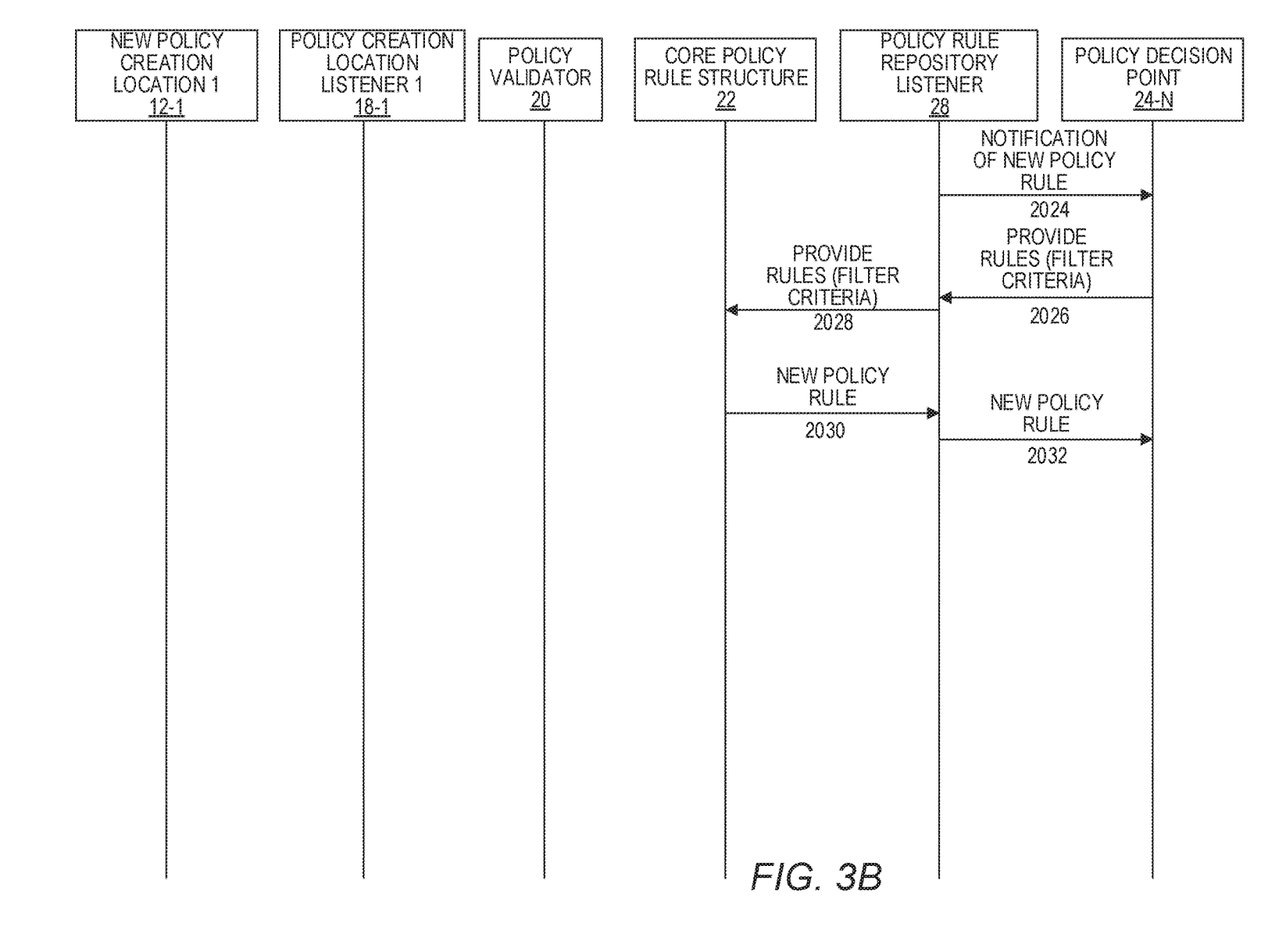

FIGS. 3A-3B are a message flow diagram illustrating a sequence of messages relating to the distribution of a new policy rule 14 to a PDP 24, according to one example. The policy creation location listener 18-1 continuously monitors the new policy creation location 12-1 (step 2000). A new policy rule 14-A is stored in the new policy creation location 12-1 (step 2002). The policy creation location listener 18-1 detects the new policy rule 14-A stored in the new policy creation location 12-1 (step 2004). The policy creation location listener 18-1 obtains the new policy rule 14-A from the new policy creation location 12-1 and sends the new policy rule 14-A to the policy validator 20 (step 2006). The policy validator 20 determines whether the new policy rule 14-A complies with the programming syntax of the programming language in which policy rules 14 are written (step 2008). The policy validator 20 determines whether the new policy rule 14-A has a proper form (step 2010). The policy validator 20 obtains related policy rules 14 from the core policy rule structure 22 (steps 2012-2014). The policy validator 20 ensures that the access rights granted by the new policy rule 14-A are not inconsistent with the related policy rules 14 (step 2016). If the validation checks pass, the policy validator 20 stores the new policy rule 14-A in the core policy rule structure 22, or communicates the new policy rule 14-A to the core policy rule structure 22 for storage (steps 2018-2020).

The policy rule repository listener 28 detects the new policy rule 14-A in the core policy rule structure 22 (step 2022). The policy rule repository listener 28 sends a notification to the PDP 24-N (step 2024). In one example, the PDP 24-N sends the policy rule repository listener 28 a request for policy rules 14 that meet certain criteria (step 2026). In other examples the PDP 24-N may use a callback mechanism to wait and update the local rules 27-N at a later time, such as during a scheduled maintenance time. In this example, assume that the PDP 24-N sends the policy rule repository listener 28 a request for policy rules 14 that meet certain criteria. The policy rule repository listener 28 sends the request to the core policy rule structure 22 (step 2028). The core policy rule structure 22 returns the new policy rule 14-A to the policy rule repository listener 28 (step 2030). The policy rule repository listener 28 sends the new policy rule 14-A to the PDP 24-N (step 2032).

Figure 4A:
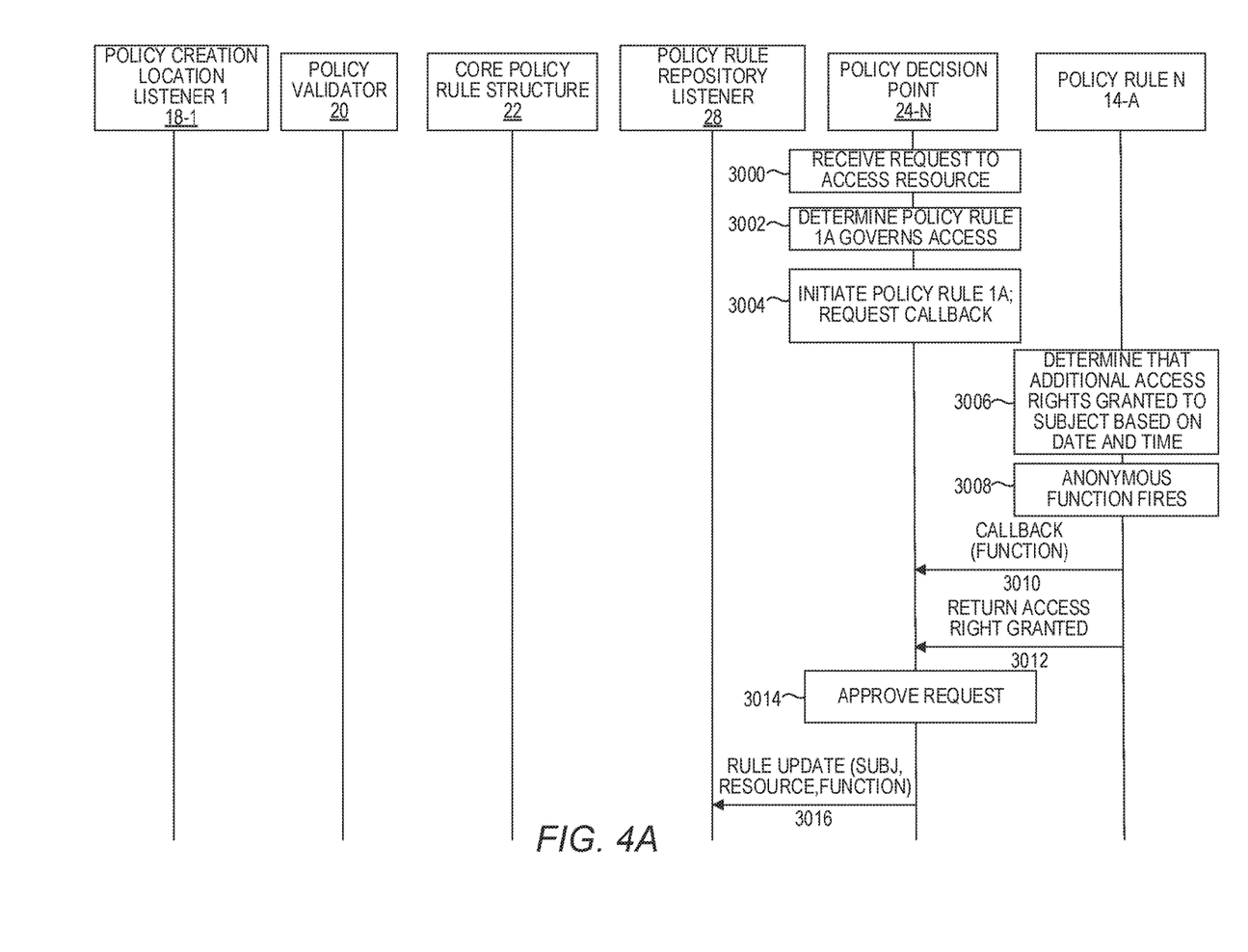
FIGS. 4A-4B are a message flow diagram illustrating a sequence of messages relating to the execution of a policy rule by a PDP, and the updating of a policy rule based on contextual information determined by a policy rule, according to one example.
Figure 4B:
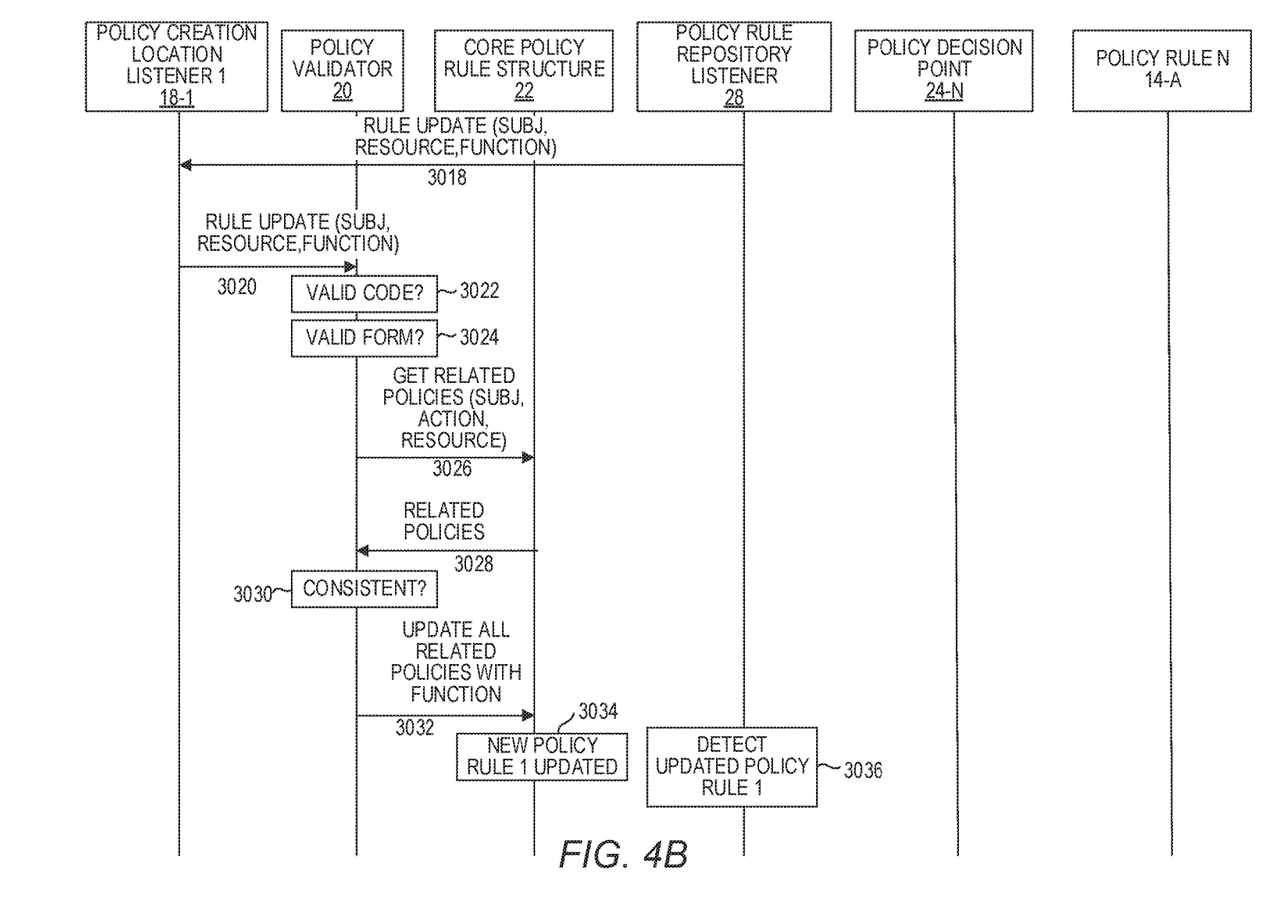

FIGS. 4A-4B are a message flow diagram illustrating a sequence of messages relating to the execution of a policy rule 14 by a PDP 24, and the updating of a policy rule based on contextual information determined by a policy rule 14, according to one example. Assume that the PDP 24-N receives a request to access a resource (step 3000). The PDP 24-N determines that the new policy rule 14-A governs access to the resource (step 3002). The PDP 24-N initiates the new policy rule 14-A, and sets a callback function that will be invoked by the new policy rule 14-A (step 3004). Below is an example code-snippet of pseudocode of an anonymous function, which is assigned to the variable 'x', according to one example.

```
var user; // our user pulled from the LDAP account
if(access.request == resource){ // resource we are protecting
    var x=
(function( ){
        if(permitted) {return user, resource(access.permitted)} // policy says yes go do something on the resource
        else if (user.override && user.override.time >= 1) { // user object has metadata associated with it
            return (function(user, user.override, access.permitted,resource){ //
            });
            else { return user, resource(access.denied)} // policy says no and override not set
        })( )
    callback(X);
}
```

The new policy rule 14-A initiates, and during initiation, determines contextual information that provides enhanced access to the resource during a particular time frame of the day (step 3006). In response to this determination, the new policy rule 14-A initiates an anonymous function with one or more variables that contain the contextual information (step 3008). The initiation of the anonymous function causes the callback function to be invoked. The new policy rule 14-A passes the anonymous function to the PDP 24-N in the callback, as well as a result for the access request (steps 3010-3012).

The PDP 24-N approves the access request (step 3014). The PDP 24-N sends a rule update message that includes the subject ID, the resource ID, and the anonymous function to the policy rule repository listener 28 (step 3016). The policy rule repository listener 28 sends the rule update message to the policy creation location listener 18-1 (step 3018). The policy creation location listener 18-1 sends the rule update message to the policy validator 20 (step 3020). The policy validator 20 may validate the anonymous function in the rule update message in the same or similar manner as discussed above with regard to FIGS. 3A-3B (steps 3022-3024). The policy validator 20 obtains related policy rules 14 from the core policy rule structure 22 (steps 3026-3028). The policy validator 20 determines that the anonymous function is consistent with the related policy rules 14 (step 3030). The policy validator 20 updates the related policy rules 14 with the anonymous function such that each related rule 14 now operates in accordance with the contextual information (steps 3032-3034). The policy rule repository listener 28 detects the updated policy rules 14 (step 3036). The updated policy rules may then be automatically distributed to the PDPs 24 as discussed above.

Figure 5:
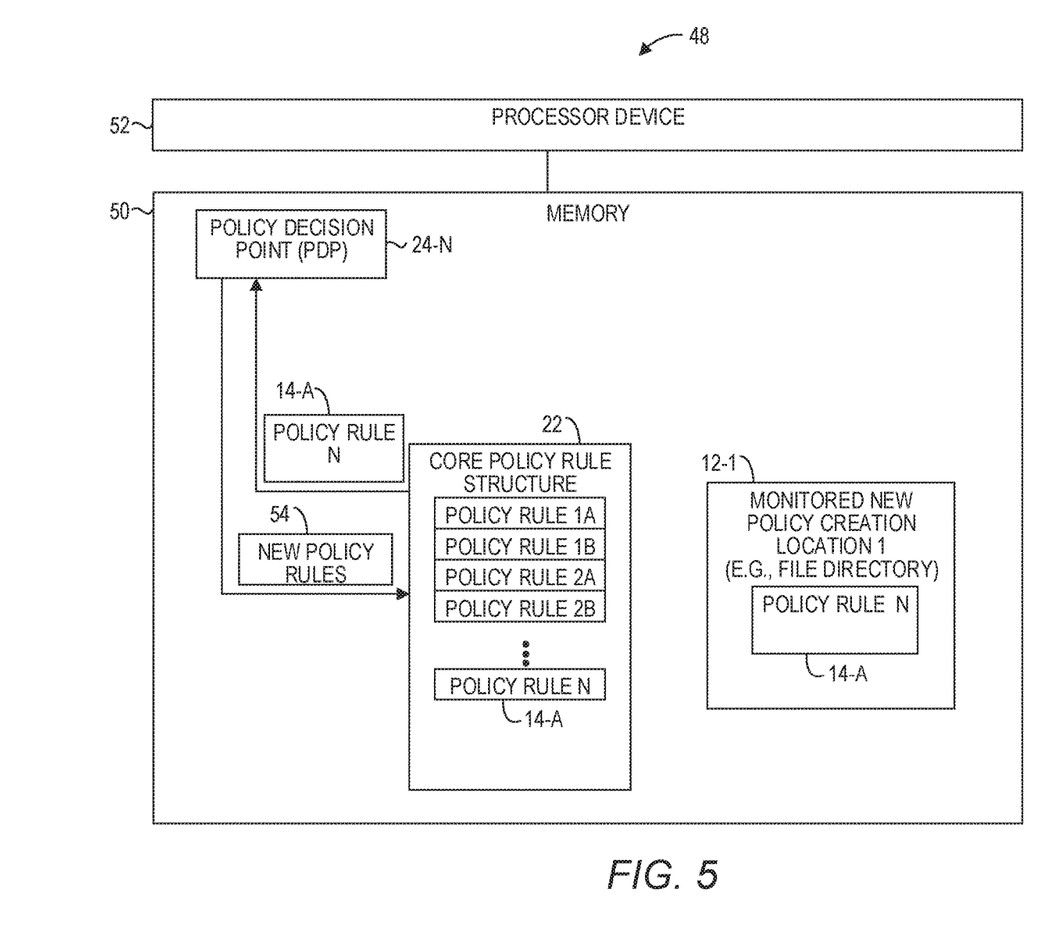
FIG. 5 is a block diagram of a computing system according to one example.

FIG. 5 is a block diagram of a computing system 48 according to one example. The computing system 48 includes one or more memories 50 and one or more processor devices 52 coupled to the one or more memories 50. The one or more processor devices 52, over a period of time, continuously monitor the new policy creation location 12-1 for a new policy rule 14. The one or more processor devices 52 detect that a new policy rule 14-A has been added to the new policy creation location 12-1. The one or more processor devices 52 store the new policy rule 14-A in the core policy rule structure 22 that comprises a plurality of policy rules 14. The one or more processor devices 52 receive a request 54 for new policy rules 14. The one or more processor devices 52 communicate the first new policy rule 14-A toward the PDP 24-N in response to the request 54.

Figure 6:
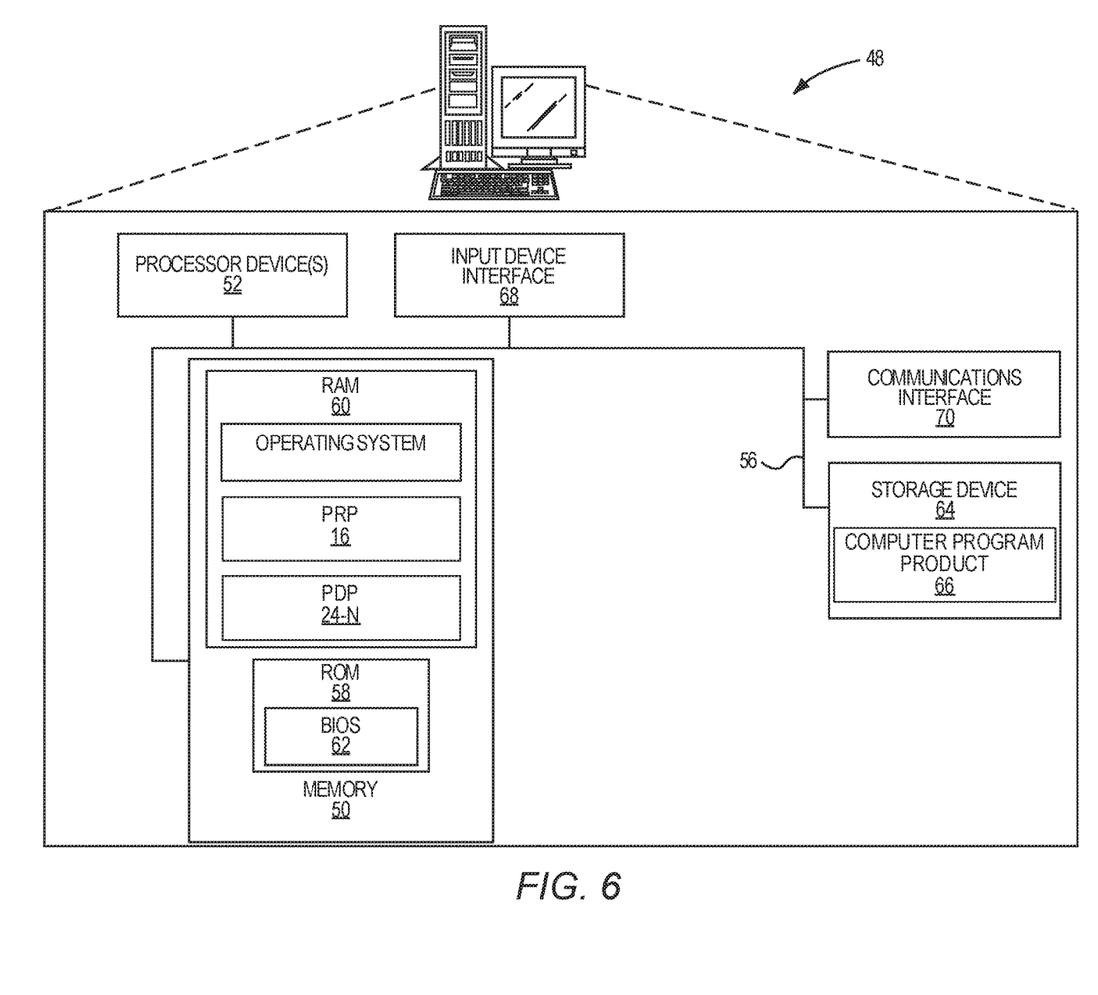
FIG. 6 is another block diagram of the computing system according to one example.

FIG. 6 is a block diagram of the computing system 48 suitable for implementing examples according to another example. The computing system 48 may comprise any computing or electronic devices capable of including firmware, hardware, and/or executing software instructions to implement the functionality described herein, such as a computer server, a desktop computing device, a laptop computing device, or the like. The computing system 48 may comprise a plurality of virtual machines, such that various components described herein may each execute on different virtual machines, and/or host machines. The computing system 48 includes the one or more processor devices 52, the one or more memories 50, and a system bus 56. The system bus 56 provides an interface for system components including, but not limited to, the one or more memories 50 and the one or more processor devices 52. The one or more processor devices 52 can be any commercially available or proprietary processor.

The system bus 56 may be any of several types of bus structures that may further interconnect to a memory bus (with or without a memory controller), a peripheral bus, and/or a local bus using any of a variety of commercially available bus architectures. The one or more memories 50 may include non-volatile memory 58 (e.g., read-only memory (ROM), erasable programmable read-only memory (EPROM), electrically erasable programmable read-only memory (EEPROM), etc.), and volatile memory 60 (e.g., random-access memory (RAM)). A basic input/output system (BIOS) 62 may be stored in the non-volatile memory 58 and can include the basic routines that help to transfer information between elements within the computing system 48. The volatile memory 60 may also include a high-speed RAM, such as static RAM, for caching data.

The computing system 48 may further include or be coupled to a non-transitory computer-readable storage medium such as a storage device 64, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 64 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 64 and in the volatile memory 60, including, by way of non-limiting example, the PRP 16, the PDP 24-N, and the like. All or a portion of the examples may be implemented as a computer program product 66 stored on a transitory or non-transitory computer-usable or computer-readable storage medium, such as the storage device 64, which includes complex programming instructions, such as complex computer-readable program code, to cause the one or more processor devices 52 to carry out the steps described herein. Thus, the computer-readable program code can comprise software instructions for implementing the functionality of the examples described herein when executed on the one or more processor devices 52. The one or more processor devices 52, in conjunction with the PRP 16, the PDP 24-N in the volatile memory 60, may serve as a controller, or control system, for the computing system 48 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the one or more processor devices 52 through an input device interface 68 that is coupled to the system bus 56 but can be connected by other interfaces such as a parallel port, an Institute of Electrical and Electronic Engineers (IEEE) 1394 serial port, a Universal Serial Bus (USB) port, an IR interface, and the like. The computing system 48 may also include a communications interface 70 suitable for communicating with a network as appropriate or desired.

Figure 7A:
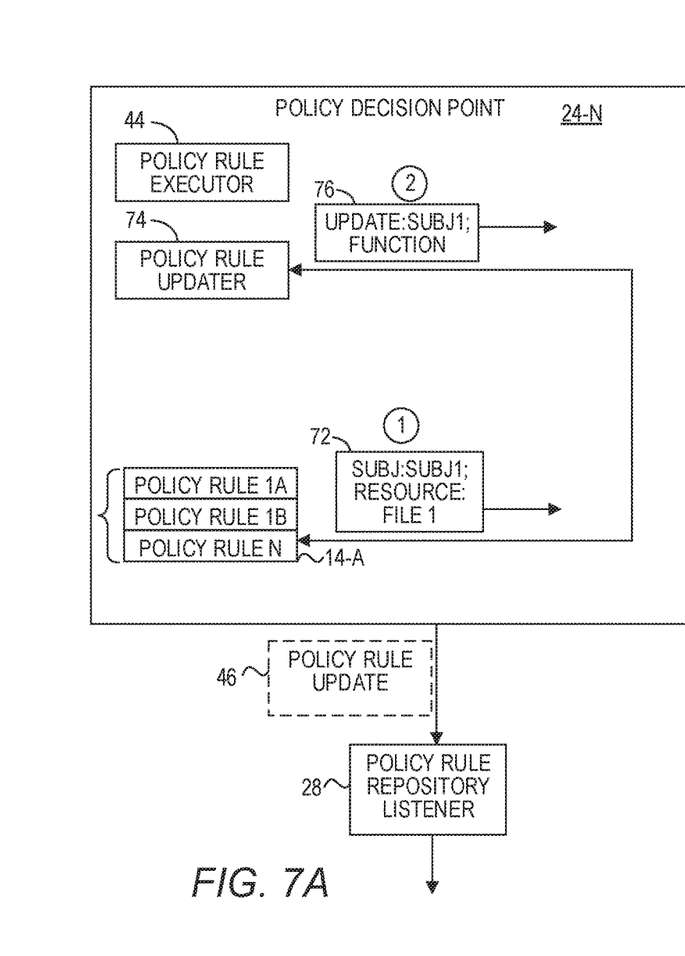
FIG. 7A is block diagram illustrating the integration by a PDP of a dynamically updated policy rule according to one embodiment.

FIG. 7A is block diagram illustrating the integration by the PDP 24-N of a dynamically updated policy rule 14 according to one embodiment. In this example the policy rules 14, such as the policy rule 14-A, may send a subscription request 72 to a policy rule updater 74. The subscription request 72 includes data that identifies the policy rule updates of interest to the subscriber. For example, the subscription request 72 may identify a subject and a resource such that any policy rule updates that affect either the subject or the resource should be provided to the policy rule 14-A. Upon determining that contextual information has altered access rights, as discussed above with regard to FIGS. 4A-4B for example, the policy rule updater 74 then provides a policy rule update 76 to each subscriber. In this example, the policy rule update 76 may include the anonymous function (discussed in steps 3006-3012 in FIG. 4A for example) that implements the additional access control rights that are based on the contextual information. Subsequent execution of the policy rule 14-A by the policy rule executor 44 will then include the additional access rights implemented by the anonymous function. The PDP 24-N also sends a policy rule update message 46 for real-time integration of the new access control rights in other PDPs 24, as discussed above with regard to FIGS. 4A-4B.

Figure 7B:
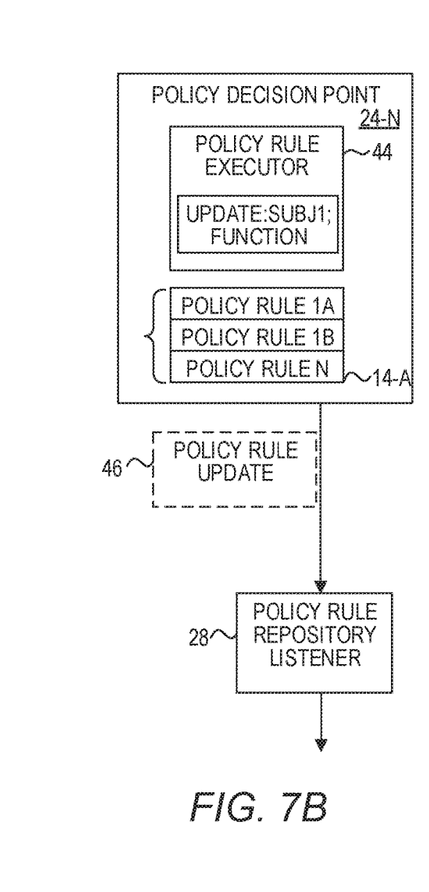
FIG. 7B is block diagram illustrating the integration by a PDP of a dynamically updated policy rule according to another embodiment.

FIG. 7B is block diagram illustrating the integration by the PDP 24-N of a dynamically updated policy rule 14 according to another embodiment. In this example, the policy rule executor 44 receives the callback with the anonymous function that implements the additional access control rights based on the contextual information. However, in this example, the policy rule executor 44 maintains the anonymous function separately in an access control list associated with the subject and the resource, and executes the anonymous function in response to subsequent access requests by the subject independently of the policy rule 14-A. The PDP 24-N also sends a policy rule update message 46 for real-time integration of the new access control rights in other PDPs 24, as discussed above with regard to FIGS. 4A-4B.

Individuals will recognize improvements and modifications to the preferred examples of the disclosure. All such improvements and modifications are considered within the scope of the concepts disclosed herein and the claims that follow.

What is claimed is:

1. A method comprising:
over a period of time, continuously monitoring, by a policy retrieval point executing on a processor device, at least one new policy creation location for a new policy rule;
detecting that a first new policy rule has been added to the at least one new policy creation location;
storing the first new policy rule in a core policy rule structure that comprises a plurality of policy rules;
receiving a request for new policy rules;
communicating the first new policy rule toward a policy decision point in response to the request for the new policy rules;
subsequent to communicating the first new policy rule toward the policy decision point, detecting that a second new policy rule has been added to the at least one new policy creation location;
making a determination that the second new policy rule is inconsistent with at least one policy rule of the plurality of policy rules in the core policy rule structure; and
refraining from storing the second new policy rule in the core policy rule structure based on the determination.

2. The method of claim 1 wherein the first new policy rule comprises a plurality of executable instructions, and further comprising:
prior to storing the first new policy rule in the core policy rule structure that comprises the plurality of policy rules, validating, by the policy retrieval point, the first new policy rule by:
determining that the plurality of executable instructions of the first new policy rule comply with a programming language syntax of an executable programming language; and
making a determination that the first new policy rule does not implement access rights in a way that is inconsistent with any policy rules of the plurality of policy rules in the core policy rule structure.

3. The method of claim 2 wherein making the determination that the first new policy rule does not implement access rights in a way that is inconsistent with any policy rules of the plurality of policy rules in the core policy rule structure further comprises:
retrieving, from the core policy rule structure, a subset of policy rules of the plurality of policy rules that are related to the first new policy rule; and
making the determination that the first new policy rule does not implement access rights in a way that is inconsistent with any policy rules of the subset of policy rules.

4. The method of claim 3 wherein the first new policy rule identifies a subject, an action, and a resource, and wherein the subset of policy rules is related to the first new policy rule based on one or more of the subject, the action, and the resource.

5. The method of claim 1 further comprising:
receiving, by the policy retrieval point from a first policy decision point, data that alters access rights implemented by the first new policy rule;
accessing the first new policy rule from the core policy rule structure;
modifying the first new policy rule with the data to generate an updated first new policy rule; and
storing the updated first new policy rule in the core policy rule structure.

6. The method of claim 5 further comprising validating, by the policy retrieval point, the updated first new policy rule by:
determining that a plurality of executable instructions of the updated first new policy rule comply with a programming language syntax of an executable programming language; and
making a determination that the updated first new policy rule does not implement the access rights in a way that is inconsistent with any policy rules of the plurality of policy rules in the core policy rule structure.

7. The method of claim 5 further comprising:
receiving, from a second policy decision point, a request that encompasses the updated first new policy rule; and
sending, to the second policy decision point, the updated first new policy rule.

8. The method of claim 1 further comprising:
determining, by the policy decision point, data that alters an access right implemented by the first new policy rule; and
sending, to the policy retrieval point, contextual data to update the first new policy rule with the contextual data.

9. The method of claim 1 further comprising:
receiving, by the policy decision point, the first new policy rule;
receiving, by the policy decision point, an access request from an access requestor;
determining that the access request is at least partially governed by the first new policy rule;
initiating the first new policy rule;
receiving an access result from the first new policy rule; and
based on the access result, implementing the access request.

10. A computing system, comprising:
one or more memories; and
one or more processor devices coupled to the one or more memories, the one or more processor devices to:
over a period of time, continuously monitor at least one new policy creation location for a new policy rule;
detect that a first new policy rule has been added to the at least one new policy creation location;
store the first new policy rule in a core policy rule structure that comprises a plurality of policy rules;
receive a request for new policy rules;
communicate the first new policy rule toward a policy decision point in response to the request for the new policy rules;
subsequent to communicating the first new policy rule toward the policy decision point, detect that a second new policy rule has been added to the at least one new policy creation location;
make a determination that the second new policy rule is inconsistent with at least one policy rule of the plurality of policy rules in the core policy rule structure; and
refrain from storing the second new policy rule in the core policy rule structure based on the determination.

11. The computing system of claim 10 wherein the first new policy rule comprises a plurality of executable instructions, and wherein the one or more processor devices are further to:
prior to storing the first new policy rule in the core policy rule structure that comprises the plurality of policy rules, validate the first new policy rule by:
determining that the plurality of executable instructions of the first new policy rule comply with a programming language syntax of an executable programming language; and
making a determination that the first new policy rule does not implement access rights in a way that is inconsistent with any policy rules of the plurality of policy rules in the core policy rule structure.

12. The computing system of claim 10 wherein the one or more processor devices are further to:
receive, a first policy decision point, data that alters access rights implemented by the first new policy rule;
access the first new policy rule from the core policy rule structure;
modify the first new policy rule with the data to generate an updated first new policy rule; and
store the updated first new policy rule in the core policy rule structure.

13. The computing system of claim 12 wherein the one or more processor devices are further to:
    validate the updated first new policy rule by:
        determining that the plurality of executable instructions of the updated first new policy rule comply with a programming language syntax of an executable programming language; and
        making a determination that the updated first new policy rule does not implement access rights in a way that is inconsistent with any policy rules of the plurality of policy rules in the core policy rule structure.

14. The computing system of claim 10 wherein the one or more processor devices are further to:
    receive, by the policy decision point, the first new policy rule;
    receive, by the policy decision point, an access request from an access requestor;
    determine that the access request is at least partially governed by the first new policy rule;
    initiate the first new policy rule;
    receive an access result from the first new policy rule; and
    based on the access result, implement the access request.

15. A non-transitory computer program product stored on a non-transitory computer-readable storage medium and including instructions to cause one or more processor devices to:
    over a period of time, continuously monitor at least one new policy creation location for a new policy rule;
    detect that a first new policy rule has been added to the at least one new policy creation location;
    store the first new policy rule in a core policy rule structure that comprises a plurality of policy rules;
    receive a request for new policy rules;
    communicate the first new policy rule toward a policy decision point in response to the request for the new policy rules;
    subsequent to communicating the first new policy rule toward the policy decision point, detect that a second new policy rule has been added to the at least one new policy creation location;
    make a determination that the second new policy rule is inconsistent with at least one policy rule of the plurality of policy rules in the core policy rule structure; and
    refrain from storing the second new policy rule in the core policy rule structure based on the determination.

16. The non-transitory computer program product of claim 15 wherein the first new policy rule comprises a plurality of executable instructions, and wherein the instructions further cause the one or more processor devices to:
    prior to storing the first new policy rule in the core policy rule structure that comprises the plurality of policy rules, validate the first new policy rule by:
        determining that the plurality of executable instructions of the first new policy rule comply with a programming language syntax of an executable programming language; and
        making a determination that the first new policy rule does not implement access rights in a way that is inconsistent with any policy rules of the plurality of policy rules in the core policy rule structure.

17. The non-transitory computer program product of claim 15 wherein the instructions further cause the one or more processor devices to:
    receive, from a first policy decision point, data that alters access rights implemented by the first new policy rule;
    access the first new policy rule from the core policy rule structure;
    modify the first new policy rule with the data to generate an updated first new policy rule; and
    store the updated first new policy rule in the core policy rule structure.

18. The non-transitory computer program product of claim 17 and wherein the instructions further cause the one or more processor devices to validate the updated first new policy rule by:
    determining that the plurality of executable instructions of the updated first new policy rule comply with a programming language syntax of an executable programming language; and
    making a determination that the updated first new policy rule does not implement access rights in a way that is inconsistent with any policy rules of the plurality of policy rules in the core policy rule structure.

19. The non-transitory computer program product of claim 15 wherein the instructions further cause the one or more processor devices to:
    receive, by the policy decision point, the first new policy rule;
    receive, by the policy decision point, an access request from an access requestor;
    determine that the access request is at least partially governed by the first new policy rule;
    initiate the first new policy rule;
    receive an access result from the first new policy rule; and
    based on the access result, implement the access request.

* * * * *